United States Patent
Chen et al.

(10) Patent No.: US 10,577,499 B2
(45) Date of Patent: Mar. 3, 2020

(54) REINFORCED POLYCARBONATE COMPOSITION WITH IMPROVED IMPACT PERFORMANCE

(71) Applicant: SABIC Global Technologies B.V., Bergen op Zoom (NL)

(72) Inventors: Lin Chen, Shanghai (CN); Ying Li, Shanghai (CN); Yun Zheng, Shanghai (CN); Hongtao Shi, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 52 days.

(21) Appl. No.: 15/551,859

(22) PCT Filed: Feb. 19, 2016

(86) PCT No.: PCT/IB2016/050917
§ 371 (c)(1),
(2) Date: Aug. 17, 2017

(87) PCT Pub. No.: WO2016/132337
PCT Pub. Date: Aug. 25, 2016

(65) Prior Publication Data
US 2018/0066133 A1 Mar. 8, 2018

(51) Int. Cl.
| | | |
|---|---|---|
| *C08L 69/00* | (2006.01) | |
| *C08L 23/16* | (2006.01) | |
| *C08L 23/18* | (2006.01) | |
| *C08K 7/14* | (2006.01) | |
| *C08K 3/013* | (2018.01) | |
| *C08K 3/016* | (2018.01) | |
| *C08K 3/34* | (2006.01) | |
| *C08K 5/523* | (2006.01) | |
| *C08L 23/20* | (2006.01) | |
| *C08L 23/08* | (2006.01) | |
| *C08K 3/105* | (2018.01) | |

(52) U.S. Cl.
CPC .............. *C08L 69/00* (2013.01); *C08K 3/013* (2018.01); *C08K 3/016* (2018.01); *C08K 3/34* (2013.01); *C08K 5/523* (2013.01); *C08K 7/14* (2013.01); *C08L 23/16* (2013.01); *C08L 23/18* (2013.01); *C08L 23/20* (2013.01); *C08K 3/105* (2018.01); *C08L 23/0815* (2013.01); *C08L 2201/02* (2013.01)

(58) Field of Classification Search
None
See application file for complete search history.

(56) References Cited

FOREIGN PATENT DOCUMENTS

| CN | 103951959 A | * | 7/2014 | ............. B29C 47/92 |
|---|---|---|---|---|
| CN | 103951959 A | | 7/2014 | |
| CN | 104066793 A | | 9/2014 | |
| WO | 2013111846 A1 | | 8/2013 | |
| WO | 2014152107 A1 | | 9/2014 | |

* cited by examiner

*Primary Examiner* — Richard A Huhn
(74) *Attorney, Agent, or Firm* — Cantor Colburn LLP

(57) ABSTRACT

In various aspects, the disclosure relates to reinforced thermoplastic compositions exhibiting improved physical properties as well as thin wall flame resistance. The reinforced thermoplastic compositions comprise polycarbonate polymer, a filler, and a polyolefin elastomer.

14 Claims, No Drawings

REINFORCED POLYCARBONATE COMPOSITION WITH IMPROVED IMPACT PERFORMANCE

CROSS-REFERENCE TO RELATED APPLICATIONS

This application is the National Stage of International Application No. PCT/IB2016/050917, filed Feb. 19, 2016, which claims the benefit of U.S. Provisional Application No. 61/118,997, filed Feb. 20, 2015, the disclosures of which are incorporated herein by reference in their entireties.

TECHNICAL FIELD

The disclosure concerns filled polycarbonate compositions exhibiting improved impact strength.

BACKGROUND

Polycarbonate materials are often processed with other materials to improve their physical performance. For instance, polycarbonates can be combined with other polymers which function as impact modifiers to produce a more resilient polycarbonate material. Fillers can also be introduced throughout a polycarbonate matrix polymer to enhance the stiffness and produce a higher modulus or tougher material. Additionally, flame retardant additives can be incorporated to improve the fire resistance ability of the material.

SUMMARY

Such filler reinforced polycarbonate compositions, also having robust flame-retardant properties, present significant technical challenges in discovering compositions that can maintain the appropriate balance of modulus, ductility, flow, thin wall flame retardancy, and impact strength. The addition of fillers and flame retardants to polycarbonate compositions can deteriorate the impact performance and other mechanical properties of these compositions. Then, inclusion of impact modifier additives can in turn diminish the flow of the polycarbonate material. The application of thermoplastic compositions in the electrical and electronic fields, especially the consumer electronics industry, increasingly requires compositions able to the meet the stringent requirements pertaining to modulus, flow, appearance, flame retardance, and heat resistance as these compositions are being utilized in applications with thin wall design. There is a need for compositions that exhibit good processability and thin wall flame retardancy while also capable of high modulus and ultra-high ductility, i.e. impact toughness and tensile elongation that are similar to the levels obtained with unfilled polycarbonate compositions. These and other shortcomings are addressed in the present disclosure.

In an aspect, the present disclosure, provides filled polycarbonate compositions, comprising a polyolefin elastomer and can include flame retardant additives as well as other reinforcing additives. As an example, provided are polycarbonate compositions that maintain fire resistance and high modulus without diminished impact performance. In a further aspect, these compositions can exhibit improved impact performance as so called FR ("fire resistant") or non-FR high modulus ductile (HMD) materials.

In one aspect, the disclosure relates to thermoplastic compositions comprising: from about 49 wt. % to about 98 wt. % of a polycarbonate component, from about 1 wt. % to about 50 wt. % of a filler, from about 0.5 wt. % to about 10 wt. % of a polyolefin elastomer, and from about 0.01 wt. % to about 1 wt. % of an additive, wherein the combined weight percent value of all components does not exceed about 100 wt. %, and wherein all weight percent values are based on the total weight of the composition, wherein the thermoplastic composition exhibits an notched Izod impact strength of at least about 150 joules per meter (J/m) to about 750 J/m at 23° C. according to ASTM D256, wherein the thermoplastic composition exhibits a modulus of at least about 3300 megapascals (MPa) to about 6100 MPa according to ASTM D638, and wherein the thermoplastic composition exhibits a melt flow rate of at least about 10 grams per ten minutes (g/10) min to about 30 g/10 min when measured at 300° C. under a load of 1.2 kilograms (kg), or at 260° C. under a load of 5.0 kg.

In another aspect, the present disclosure relates to thermoplastic compositions comprising: from about 49 wt. % to about 80 wt. % of a polycarbonate component, from about 10 wt. % to about 40 wt. % of a filler, from about 0.5 wt. % to about 10 wt. % of a polyolefin elastomer, from about 8 wt. % to about 15 wt. % of a flame retardant, from about 0.01 wt. % to about 1 wt. % of an additive, wherein the combined weight percent value of all components does not exceed about 100 wt. %, and wherein all weight percent values are based on the total weight of the composition, wherein the thermoplastic composition exhibits an notched Izod impact strength of at least about 70 J/m to about 120 J/m at 23° C. according to ASTM D256, wherein the thermoplastic composition exhibits a modulus of at least about 3300 MPa to about 7600 MPa according to ASTM D638, wherein the thermoplastic composition exhibits a melt flow rate of at least about 10 g/10 min to about 30 g/10 min when measured at 260° C. under a 2.16 kg load according to ASTM D1238, and wherein the thermoplastic composition achieves a UL 94 V0 rating of 1.5 mm or less or a UL 94 V1 rating of 1.2 millimeters (mm) or less.

Furthermore, this disclosure relates to a method comprising: forming a thermoplastic composition comprising from about 49 wt. % to about 98 wt. % of a polycarbonate component, from about 1 wt. % to about 50 wt. % of a filler, from about 0.5 wt. % to about 10 wt. % of a polyolefin elastomer, and from about 0.01 wt. % to about 1 wt. % of an additive, wherein the combined weight percent value of all components does not exceed about 100 wt. %, and wherein all weight percent values are based on the total weight of the composition.

Also disclosed are methods comprising forming a thermoplastic composition comprising from about 49 wt. % to about 80 wt. % of a polycarbonate component, from about 10 wt. % to about 40 wt. % of a filler, from about 0.5 wt. % to about 10 wt. % of a polyolefin elastomer, from about 8 wt. % to about 15 wt. % of a flame retardant, and from about 0.01 wt. % to about 1 wt. % of an additive, wherein the combined weight percent value of all components does not exceed about 100 wt. %, and wherein all weight percent values are based on the total weight of the composition.

In another aspect, the disclosure concerns an article prepared according to the methods of forming a thermoplastic composition as disclosed herein.

DETAILED DESCRIPTION

The use of reinforcing fillers in thermoplastic compositions presents the challenge of maintaining an appropriate balance of mechanical properties such as modulus, flow, ductility, appearance, thin wall flame resistance, and impact strength. For example, while the addition of a filler can provide a marked improvement in flow, impact strength can be simultaneously diminished. The thermoplastic compositions of the present disclosure can provide reinforced polycarbonate compositions exhibiting a balance of flow, impact strength, ductility, and flame resistance. The present disclosure concerns thermoplastic compositions comprising a polycarbonate polymer component, a polyolefin elastomer, a filler, and an additive. In a further aspect, the thermoplastic composition can comprise a flame retardant additive. In various aspects, the compositions can exhibit high modulus and impact strength while retaining an appropriate balance of other properties such good processability and thin wall flame retardancy.

Polycarbonate Polymer

In an aspect, the thermoplastic composition can comprise a polycarbonate polymer component. For example, the polycarbonate component can comprise a polycarbonate copolymer, polyester carbonate polymer, or polycarbonate-polysiloxane copolymer, or some combination thereof. In further aspects, the polycarbonate polymer can comprise a mixture of a first polycarbonate and a second polycarbonate.

As used herein, the term "polycarbonate" includes homopolycarbonates and copolycarbonates have repeating structural carbonate units. In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol. In various aspects, the polycarbonate can comprise copolymers comprising two or more distinct carbonate units. For example, a polycarbonate copolymer can comprise repeating carbonate units derived from bisphenol acetophenone (BisAP) and a second, chemically distinct dihydroxy monomer such as a bisphenol, e.g. bisphenol A. Alternatively, a polycarbonate copolymer can comprise repeating carbonate units derived from (N-Phenyl Phenolphthalein) PPPBP and a second, chemically distinct dihydroxy monomer such as a bisphenol, e.g. bisphenol A.

In one aspect, the polycarbonate can comprises aromatic carbonate chain units and includes compositions having structural units of the formula (I):

(I)

in which the $R^1$ groups are aromatic, aliphatic or alicyclic radicals. Beneficially, $R^1$ is an aromatic organic radical and, in an alternative aspect, a radical of the formula (II):

$-A^1-Y^1-A^2-$ (II)

wherein each of $A^1$ and $A^2$ is a monocyclic divalent aryl radical and $Y^1$ is a bridging radical having zero, one, or two atoms which separate $A^1$ from $A^2$. In an exemplary aspect, one atom separates $A^1$ from $A^2$. In another aspect, zero atoms separate $A^1$ from $A^2$, with an illustrative example being bisphenol. The bridging radical $Y^1$ can be a hydrocarbon group or a saturated hydrocarbon group such as methylene, cyclohexylidene or isopropylidene.

Polycarbonates can be produced by the interfacial reaction polymer precursors such as dihydroxy compounds in which only one atom separates $A^1$ and $A^2$. As used herein, the term "dihydroxy compound" includes, for example, bisphenol compounds having general formula (III) as follows:

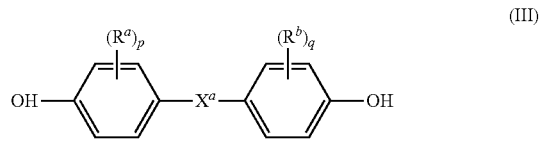

(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

(IV)

wherein $R^c$ and $R^d$ each independently represent a hydrogen atom or a monovalent linear or cyclic hydrocarbon group, and $R^e$ is a divalent hydrocarbon group.

Non-limiting examples of the types of bisphenol compounds that can be represented by formula (IV) can include the bis(hydroxyaryl)alkane series such as, 1,1-bis(4-hydroxyphenyl)methane, 1,1-bis(4-hydroxyphenyl)ethane; bis(hydroxyaryl)cycloalkane series such as, 1,1-bis(4-hydroxyphenyl)cyclopentane, 1,1-bis(4-hydroxyphenyl)cyclohexane, or the like, or combinations including at least one of the foregoing bisphenol compounds. Other bisphenol compounds that can be represented by formula (III) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations including at least one of the foregoing bisphenol compounds.

Other bisphenol compounds that can be utilized in the polycondensation of polycarbonate are represented by the formula (V)

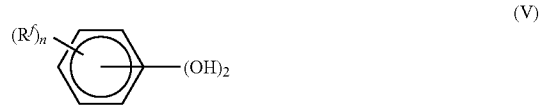

(V)

wherein, $R^f$, is a halogen atom of a hydrocarbon group having 1 to 10 carbon atoms or a halogen substituted hydrocarbon group; n is a value from 0 to 4. When n is at least 2, $R^f$ can be the same or different. Examples of bisphenol compounds that can be represented by the formula (IV), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafluoro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations including at least one of the foregoing bisphenol compounds.

In one aspect, the bisphenol compound is bisphenol A. In an exemplary aspect, the polycarbonate polymer component comprises a bisphenol A polycarbonate polymer. In another exemplary aspect, the polycarbonate component comprises a blend of at least two different grade bisphenol A polycarbonates. To that end, a polycarbonate grade can, for example, be characterized by the melt volume rate (MVR) of the polycarbonate. For example, a disclosed polycarbonate, such as a bisphenol A polycarbonate, can be characterized by exhibiting a melt Volume Rate (MVR) in the range of from 4 g/10 min to 30 g/10 min at 300° C./1.2 kg. For example, the MVR can range from 10 g/10 min to 25 g/10 min, including for example a MVR in the range of from 15 g/10 min to 20 g/10 min. Further, for example, the MVR can be in the range of from 4 g/10 min or 30 g/10 min.

As noted, in at least one aspect, the composition can include a first and second polycarbonate as the polycarbonate polymer. In a further aspect, the polycarbonate polymer can comprise at least one bisphenol-A polycarbonate polymer. Non-limiting examples of the polycarbonate can include C023A, available from SABIC, a 100 grade polycarbonate, or C017, available from SABIC, a high flow polycarbonate.

As an example, in an aspect wherein the polycarbonate polymer component comprises at least a first and a second polycarbonate polymer, the first polycarbonate polymer can be present in an amount in the range of from 30 wt. % to 70 wt. %, or from about 30 wt. % to about 70 wt. % relative to the total weight of the polycarbonate polymer component. Similarly, the second polycarbonate polymer can be present in an amount in the range of from 10 wt. % to 25 wt. %, or from about 10 wt. % to about 25 wt. % relative to the total weight of the polycarbonate polymer component.

For example, in an exemplary aspect, a polycarbonate polymer component comprising two different grade bisphenol A polycarbonates can be present in the thermoplastic composition in an amount in the range of from 50 wt. % to 90 wt. %, from about 50 wt. % to about 90 wt. %. According to this aspect, a first bisphenol A polycarbonate can be present in an amount in the range of 50 wt. % to 70 wt. %, or from about 50 wt. % to about 70 wt. %. Likewise, the second bisphenol A polycarbonate can be present in an amount in the range of from 5 wt. % to 20 wt. %, or from about 5 wt. % to about 20 wt. % relative to the total weight of thermoplastic composition.

In another exemplary aspect, a first bisphenol A polycarbonate can be present in an amount in the range of from 10 wt. % to 15 wt. %, or from about 10 wt. % to about 15 wt. %, relative to the total weight of thermoplastic composition. Likewise, a second bisphenol A polycarbonate can be present in an amount in the range of from 50 wt. % to about 60 wt. %, or from about 50 wt. % to about 60 wt. % relative to the total weight of thermoplastic composition. As a further example, the first bisphenol A polycarbonate can be present in an amount in the range of from 25 wt. % to 35 wt. %, or from about 25 wt. % to about 35 wt. % relative to the total weight of thermoplastic composition. The second bisphenol A polycarbonate can be present in an amount in the range of from 20 wt. % to 30 wt. %, or from about 20 wt. % to about 30 wt. %. In one example, a first bisphenol polycarbonate can have a molecular weight from 20,000 Daltons to 25,000 Daltons, or from about 20,000 Daltons to about 25,000 Daltons. In a further example, a second bisphenol polycarbonate can have a molecular weight from 28,000 Daltons to 35,000 Daltons, or from about 28,000 Daltons to about 35,000 Daltons.

In another aspect, the polycarbonate polymer used in the thermoplastic composition includes a polycarbonate polymer blend, such that a polycarbonate is blended with another resin or polymer.

In one aspect, the polycarbonate polymer component can include a blend of a polycarbonate with a polystyrene polymer. Examples can include polycarbonate/acrylonitrile-butadiene-styrene resin blends. The term "polystyrene" as used herein includes polymers prepared by bulk, suspension and emulsion polymerization, which contain at least 25% by weight of polymer precursors having structural units derived from a monomer of the formula (VI):

wherein $R^5$ is hydrogen, lower alkyl or halogen; $Z^1$ is vinyl, halogen or lower alkyl; and p is from 0 to about 5. These organic polymers include homopolymers of styrene, chlorostyrene and vinyltoluene, random copolymers of styrene with one or more monomers illustrated by acrylonitrile, butadienedivinylbenzene and maleic anhydride, and rubber-modified polystyrenes including blends and grafts, wherein the rubber is a polybutadiene or a rubbery copolymer of from 98 wt. % to 70 wt. %, or from about 98 wt. % to about 70 wt. % styrene and from 2 wt. % to 30 wt. %, or from about 2 wt. % to about 30 wt. % diene monomer. Polystyrenes are miscible with polyphenylene ether in all proportions, and any such blend can contain polystyrene in amounts of from 5 wt. % to 95 wt. %, or from about 5 wt. % to about 95 wt. % and most often from 25 wt. % to about 75 wt. %, or from about 25 wt. % to about 75 wt. %, based on the total weight of the polymers.

Polycarbonates" and "polycarbonate polymers" as used herein can further include blends of polycarbonates with other copolymers comprising carbonate chain units. An exemplary copolymer is a polyester carbonate, also known as a copolyester-polycarbonate. Such copolymers further contain, in addition to recurring carbonate chain units, repeating units of formula (VII)

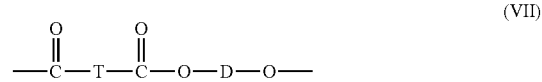

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one aspect, D is a $C_{2-6}$ alkylene radical. In another aspect, D is derived from an aromatic dihydroxy compound of formula (VIII):

(VIII)

wherein each $R^h$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (VIII) include resorcinol, substituted resorcinol compounds such as 5-methyl resorcinol, 5-ethyl resorcinol; hydroquinone; substituted hydroquinones such as 2-methyl hydroquinone, 2-ethyl hydroquinone, or the like; or combinations comprising at least one of the foregoing compounds.

Examples of aromatic dicarboxylic acids that can be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is from 10:1 to 0.2:9.8 or from about 10:1 to about 0.2:9.8. In another specific aspect, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In other aspects, poly(alkylene terephthalates) can be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from 0.5 to 10 percent by weight (pbw) or from about 0.5 to about 10 pbw, of units derived from an aliphatic diacid and/or an aliphatic polyol to make copolyesters.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly (cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (IX):

(IX)

wherein, as described using formula (IX), D is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polycarbonate polymer component can also comprise a polycarbonate-polysiloxane copolymer. As used herein, the term "polycarbonate-polysiloxane copolymer" is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. The polysiloxane-polycarbonate copolymer comprises polydiorganosiloxane blocks comprising structural units of the general formula X) below:

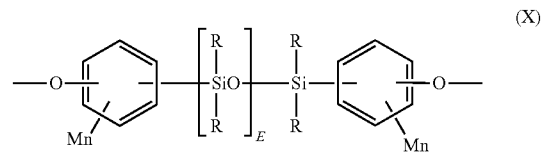

(X)

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (XI) below:

(XI)

wherein at least 60 percent of the total number of $R^1$ groups comprise aromatic moieties and the balance thereof comprise aliphatic, alicyclic, or aromatic moieties. Polysiloxane-polycarbonates materials include materials disclosed and described in U.S. Pat. No. 7,786,246, which is hereby incorporated by reference in its entirety for the specific purpose of disclosing various compositions and methods for manufacture of same.

Non-limiting examples of polysiloxane-polycarbonate copolymers can comprise various copolymers available from SABIC. In an aspect, the polysiloxane-polycarbonate copolymer can contain 6% by weight polysiloxane content based upon the total weight of the polysiloxane-polycarbonate copolymer. In various aspects, the 6% by weight polysiloxane block copolymer can have a weight average molecular weight (Mw) of from 23,000 to 24,000 Daltons, or from about 23,000 to 24,000 Daltons, using gel permeation chromatography with a bisphenol A polycarbonate absolute molecular weight standard. In certain aspects, the 6% weight siloxane polysiloxane-polycarbonate copolymer can have a melt volume flow rate (MVR) of 10 $cm^3$/10 minutes, or about 10 $cm^3$/10 min, at 300° C./1.2 kg (see C9030T, a 6% by weight polysiloxane content copolymer available from SABIC as "transparent" EXL C9030T resin polymer). In another example, the polysiloxane-polycarbonate block can comprise 20% by weight polysiloxane based upon the total weight of the polysiloxane block copolymer. For example, an appropriate polysiloxane-polycarbonate copolymer can be a bisphenol A polysiloxane-polycarbonate copolymer endcapped with para-cumyl phenol (PCP) and having a 20% polysiloxane content (see C9030P, commercially available from SABIC as the "opaque" EXL C9030P). In various aspects, the weight average molecular weight of the 20% polysiloxane block copolymer can be from 29,900 Daltons to 31,000 Daltons, or from about 29,900 Daltons to about 31,000 Daltons when tested according to a polycarbonate standard using gel permeation chromatography (GPC) on a cross-linked styrene-divinylbenzene column and calibrated to polycarbonate references using a UV-VIS detector set at 264 nm on 1 mg/ml samples eluted at a flow rate of 1.0 ml/minute, or about 1.0 ml/minute. Moreover, the 20% polysiloxane block copolymer can have an MVR at 300° C./1.2 kg of 7 $cm^3$/10 min and can exhibit siloxane domains sized in a range of from 5 micron to 20 micrometers (microns, μm), or from about 5 μm to about 20 μm.

In various aspects, the polycarbonate polymer is present in an amount from about 49 wt. % to about 98 wt. % of the total weight of the thermoplastic composition. In a still further aspect, the polycarbonate polymer is present in an amount from about 49 wt. % to about 90 wt %. In a yet further aspect, the polycarbonate polymer is present in an amount from about 49 wt. % to about 85 wt. %. As an example, the polycarbonate polymer is present an amount about 50 wt. %. In a yet further aspect, the polycarbonate polymer is present in an amount of about 60 wt. %. In an even further aspect, the polycarbonate polymer is present in an amount of about 70 wt. %.

In further aspects, the polycarbonate polymer is present in an amount from 49 wt. % to 98 wt. % of the total weight of the thermoplastic composition. In a still further aspect, the polycarbonate polymer is present in an amount from 49 wt. % to 90 wt %. In a yet further aspect, the polycarbonate polymer is present in an amount from 49 wt. % to 85 wt. %. As an example, the polycarbonate polymer is present an amount 50 wt. %. In a yet further aspect, the polycarbonate polymer is present in an amount of 60 wt. %. In an even further aspect, the polycarbonate polymer is present in an amount of 70 wt. %.

Filler

The thermoplastic composition disclosed herein can comprise one or more fillers. The filler can be selected to impart additional impact strength and/or provide additional characteristics that can be based on the final selected characteristics of the polymer composition.

Appropriate fillers or reinforcing agents can include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer matrix. Fillers generally can be used in amounts of 1 to 200 parts by weight, based on 100 parts by weight of based on 100 parts by weight of the total composition.

In one aspect, the filler can comprise glass fiber. In a further aspect, the glass fiber can be organic silane sized. As an example, the organic silane can be coated or grafted on the surface of the glass fiber to enhance its adhesion to the resin matrix. The glass fiber can have a round or flat cross section. For example, the glass fiber can have a round cross section with a diameter of from 10 micrometers (μm) to 20 μm, or from about 10 μm to about 20 μm. In an example, the glass fiber can have a diameter of 13 μm, or about 13 μm. In further aspects, the glass fibers can have a pre-compounded length of from 0.1 mm to 20 mm, or from about 0.1 mm to about 20 mm. As an example, the glass fibers can have a pre-compounded length of 4 mm, or about 4 mm. In some aspects of the disclosed composition, the glass fibers can have a length of 2 mm or longer.

In an aspect, the glass fiber can also be surface-treated with a surface treatment agent containing a coupling agent. Appropriate coupling agents can include, but are not limited to, silane-based coupling agents, titanate-based coupling agents or a mixture thereof. Suitable silane-based coupling agents can include aminosilane, epoxysilane, amidesilane, azidesilane and acrylsilane. The disclosed thermoplastic composition can comprise from 5 wt. % to 50 wt. %, or from about 5 wt. % to about 50 wt. % of glass fiber filler. For example, the glass fiber can be present in an amount of 25 wt. % or about 25 wt. %.

In various aspects, the filler can comprise talc. For example, the thermoplastic composition can comprise fine talc as a filler. The talc filler can have an average diameter of from 0.1 microns (micrometers, μm) to 4.0 μm, or from about 0.1 μm to about 4.0 μm. In a further aspect, the talc filler can have an average diameter from 0.1 μm to 3.5 μm, or from about 0.1 µm to about 3.5 µm. In a yet further aspect, the talc filler can have an average diameter from 0.5 µm to 3.5 µm, or from about 0.5 µm to about 3.5 µm. As an example, the talc can have an average diameter of 1.1 µm, or about 1.1 µm. In some aspects, the talc filler can have a specific surface area from 10 square meters per gram ($m^2/g$) to 45 $m^2/g$, or from about 10 $m^2/g$ to about 45 $m^2/g$. In yet a further aspect, the talc filler can have a specific surface area from 10 $m^2/g$ to 40 40 $m^2/g$, or from about 10 $m^2/g$ to about 40 $m^2/g$. In an even further aspect, the talc filler can have a specific surface area from 15 $m^2/g$ to 50 $m^2/g$, or from about 15 $m^2/g$ to about 50 $m^2/g$. In a still further aspect, the talc filler can have a specific surface area from 15 $m^2/g$ to 40 $m^2/g$, or from about 15 $m^2/g$ to about 40 $m^2/g$. For example, the talc filler can have a specific surface area of 14.5 $m^2/g$, or about 14.5 $m^2/g$. In some aspects, the thermoplastic composition can comprise talc in an amount from 5 wt. % to 40 wt. %, or from about 5 wt. % to about 40 wt. % of the total weight of the composition.

In further aspects, the filler can comprise a calcium silicate mineral. The calcium silicate material can have a mean particle size of 5 µm to 20 µm, or from about 5 µm to about 20 µm. In a further aspect, the calcium silicate material can have a mean particle size of from 10 µm to 15 µm, or from about 10 µm to about 15 µm. In an aspect, the filler can comprise wollastonite in an amount from 5 wt. % to 40 wt. %, or from about 5 wt. % to about 40 wt. %.

Polyolefin Elastomer

In one aspect, the thermoplastic composition can comprise a polyolefin elastomer. In a further aspect, the polyolefin elastomer is unmodified, or non-functionalized. Polyolefins comprise a class of organic compounds having the general structure $C_nH_{2n}$. As used herein, "polyolefin elastomer" or "polyolefin elastomer polymer" can refer to polyolefin resins which are polymerized with an olefin monomer such as propylene, ethylene or butene and can be selected according to the required performance of a product such as heat resistance, flexibility and transparency. The polyolefin elastomer polymer can be used alone or in admixture of a plurality of polyolefin resins in consideration of their crystallinity, noncrystallinity and elasticity.

Exemplary polyolefin resins can include, but are not limited to, polypropylene homopolymers such as isotactic polypropylene, syndiotactic polypropylene and atactic polypropylene, polyethylene resins, propylene α-olefin copolymers or ethylene α-olefin copolymers having at least one α-olefin monomer such as ethylene, propylene, butene, pentene, hexene, heptene, octene or 4-methylpentene-1, ethylene vinylacetate copolymers, ethylene vinyl alcohol copolymers, ethylene acrylic acid copolymers, cyclic polyolefin resins such as those made from pentadiene and/or derivatives, and the like; polypropylene homopolymers such as isotactic polypropylene, syndiotactic polypropylene and atactic polypropylene, polyethylene resins, propylene α-olefin copolymers or ethylene α-olefin copolymers having at least one α-olefin monomer such as ethylene, propylene, butene, pentene, hexene, heptene, octene or 4-methylpentene-1, ethylene vinylacetate copolymers, ethylene vinyl alcohol copolymers, ethylene acrylic acid copolymers, cyclic polyolefin resins such as those made from pentadiene and/or derivatives, and the like.

In various aspects, the polyolefins used can include conventional low density polyethylene (LDPE) made under high pressure; LDPE copolymers incorporating other α-olefins polyethylene/vinyl acetate copolymers; linear low density polyethylenes (LLDPE), which include copolymers of ethylene with one or more of propylene, butene, hexene, 4-methyl pentene-1, octene-1, and other unsaturated aliphatic hydrocarbons. In one aspect, the α-olefins are propylene, butene-1, hexene-1,4-methylpentene-1 and octene-1.

Substantially linear ethylene polymer or one or more linear ethylene polymer (SLEP) type, or a mixture thereof, can be useful in the disclosed thermoplastic compositions. Both substantially linear ethylene polymers and linear ethylene polymers are known. Substantially linear ethylene polymers and their method of preparation are fully described in U.S. Pat. Nos. 5,272,236 and 5,278,272. Linear ethylene polymers and their method of preparation are fully disclosed in U.S. Pat. Nos. 3,645,992; 4,937,299; 4,701,432; 4,937,301; 4,935,397; 5,055,438; EP 129,368; EP 260,999; and WO 90/07526. Such polymers are available commercially under the trade names ENGAGE™ polyolefin elastomers and AFFINITY™ polyolefin plastomers from The Dow Chemical Company, EXACT™ polyolefin elastomers from ExxonMobil, and TAFMER™ polyolefin elastomers from Mitsui.

Suitable polyolefin elastomer polymers of the substantially linear polyethylenes (or, SLEP) type can comprise one or more $C_2$ to $C_{20}$ alpha-olefins in polymerized form and having a $T_g$ less than 25° C., or less than about 25° C. In a further aspect, suitable polyolefin elastomer polymers of the SLEP type can comprise one or more $C_2$ to $C_{20}$ alpha-olefins in polymerized form and having a $T_g$ less than 0° C., or less than about 0° C. In a still further aspect, suitable polyolefin elastomer polymers of the SLEP type can comprise one or more $C_2$ to $C_{20}$ alpha-olefins in polymerized form and having a $T_g$ less than −25° C., or less than about −25° C. Examples of the types of polymers from which the present SLEP can be selected include copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene or ethylidene norbornene.

In a further aspect, the polyolefin elastomer can be used alone or in admixture of a plurality of polyolefin resins. Copolymers of polyolefins can also be used. Additionally the polyolefin can comprise a combination of homopolymer and copolymer, a combination of homopolymers having different melt temperatures, and/or a combination of homopolymers having a different melt flow rate.

In various aspects of the present disclosure, the polyolefin elastomer can be unmodified, or non-functionalized. As used herein, unmodified or "non-functionalized" refers to the absence of functional groups on the primary chain of the polyolefin. In an example, the polyolefin elastomers of the disclosed composition thus are not copolymerized or grafted with a saturated or unsaturated monomer comprising epoxy, carboxyl, or an acid anhydride group. As a further example, and not to be limiting, the polyolefin elastomer does not include a grafting copolymer such as a maleic anhydride grafting polyethylene copolymer. In an aspect, the disclosed thermoplastic composition can comprise a polyolefin elastomer in an amount from 0.5 wt. % to 10 wt. %, or from about 0.5 wt. % to about 10 wt. %, of the total weight of the thermoplastic composition.

Flame Retardant

In certain aspects of the present disclosure, the thermoplastic compositions can comprise a flame retardant additive. The flame retardant additive can comprise any flame retardant material or mixture of flame retardant materials suitable for use in the inventive thermoplastic compositions. In an example, the flame retardant additive can comprise a phosphate containing material. In another example, the flame retardant additive can comprise a halogen containing material. In further examples, the flame retardant additive can be free of or substantially free of one or more of phosphate and/or a halogen. Substantially free of can refer to less than 0.1 wt. % of the total weight of the composition.

In a further aspect, the flame retardant additive can comprise an oligomer organophosphorous flame retardant, including for example, bisphenol A diphenyl phosphate (BPADP). In a further example, the flame retardant can be selected from oligomeric phosphate, polymeric phosphate, oligomeric phosphonate, ammonium polyphosphate (Exolit OP) or mixed phosphate/phosphonate ester flame retardant compositions. The flame retardant can be selected from triphenyl phosphate; cresyldiphenylphosphate; tri(isopropylphenyl)phosphate; resorcinol bis(diphenylphosphate); and bisphenol-A bis(diphenyl phosphate). In an aspect, the flame retardant can comprise bisphenol A bis(diphenyl phosphate) (BPDAP).

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials can include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. A halogen containing flame retardant can be present in amounts of 1 to 25 parts by weight, more specifically 2 to 20 parts by weight, based on 100 parts by weight of the total composition, excluding any filler.

Additives

The disclosed thermoplastic composition can comprise one or more additives conventionally used in the manufacture of molded thermoplastic parts with the proviso that the optional additives do not adversely affect the desired properties of the resulting composition. Mixtures of optional additives can also be used. Such additives can be mixed at a suitable time during the mixing of the components for forming the composite mixture. For example, the disclosed composition can comprise one or more additional fillers, plasticizers, stabilizers, anti-static agents, impact modifiers, colorant, antioxidant, and/or mold release agents. In one aspect, the composition can further comprises one or more additives selected from an antioxidant, a mold release agent, and stabilizer.

The thermoplastic composition can comprise an antioxidant. The antioxidants can include either a primary or a secondary antioxidant. For example, antioxidants can include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations including at least one of the foregoing antioxidants. Antioxidants can generally be used in amounts of from 0.01 to 0.5 parts by weight, based on 100 parts by weight of the total composition, excluding any filler.

In various aspects, the thermoplastic composition can comprise a mold release agent. Exemplary mold releasing agents can include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight (pbw), or from about 0.1 to about 1.0 pbw, based on 100 parts by weight of the total composition, excluding any filler.

In an aspect, the thermoplastic composition can comprise a heat stabilizer. As an example, heat stabilizers can include, for example, organo phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers can generally be used in amounts of from 0.01 to 0.5 parts by weight based on 100 parts by weight of the total composition, excluding any filler.

In further aspects, light stabilizers can be present in the thermoplastic composition. Exemplary light stabilizers can include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers can generally be used in amounts of from 0.1 to 1.0 pbw, or from about 0.1 to about 1.0 pbw, by weight, based on 100 parts by weight of the total composition, excluding any filler.

The thermoplastic composition can also comprise plasticizers. For example, plasticizers can include phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from about 0.5 to about 3.0 pbw parts by weight, or from about 0.5 to about 3.0 pbw, based on 100 parts by weight of the total composition, excluding any filler.

In further aspects, the disclosed composition can comprise antistatic agents. These antistatic agents can include, for example, glycerol monostearate, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

Ultraviolet (UV) absorbers can also be present in the disclosed thermoplastic composition. UV absorbers are generally used in amounts of from 0.01 to 3.0 parts by weight, based on 100 parts by weight of the total composition, excluding any filler.

The thermoplastic composition can further comprise a lubricant. As an example, lubricants can include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants can generally be used in amounts of from 0.1 to 5 pbw, or from about 0.1 to about 5 pbw, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. In one example, TSAN can comprise 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. An antidrip agent, such as TSAN, can be used in amounts of 0.1 to 10 parts by weight, based on 100 parts by weight of the total composition, excluding any filler.

Additionally, additives to improve flow and other properties may be added to the composition, such as low molecular weight hydrocarbon resins. These materials are also known as process aids. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, and the like; cyclic olefins and diolefins, e.g. cyclopentene, cyclopentadiene, and the like; cyclic diolefin dienes, e.g., dicyclopentadiene, methylcyclopentadiene dimer and the like; and aromatic hydrocarbons, e.g. vinyltoluenes, indenes, and the like. The resins can additionally be partially or fully hydrogenated.

Properties and Articles

In certain embodiments, the thermoplastic compositions can exhibit improved impact strength, flow, and mechanical properties. The thermoplastic compositions can exhibit a notched Izod impact strength of 70 J/m to 750 J/m, or from about 70 J/m to about 750 J/m when tested according to ASTM D256. In further embodiments, the thermoplastic compositions can exhibit a modulus of 3300 MPa to 7600 MPa, or from about 3300 MPa to about 7600 MPa when tested according to ASTM D638. Finally, in various embodiments, the compositions can have a flow rate of at least 10 grams/10 minutes (g/10 mins) to 30 g/10 mins, or from about 10 g/10 mins to about 30 g/10 mins when measured at 300° C. under a load of 1.2 kg, or at 260° C. under a load of 5 kg in accordance with ASTM D1238. In other embodiments, the thermoplastic composition can achieve a UL 94 V0 rating of 1.5 mm or less. In a yet further embodiment, the thermoplastic composition can achieve a UL 94 V1 rating of 1.2 mm or less.

In various aspects, the present disclosure relates to articles comprising the thermoplastic compositions herein. The thermoplastic compositions can be molded into useful shaped articles by a variety of means such as injection molding, extrusion, rotational molding, blow molding and thermoforming to form articles. The thermoplastic compositions can be useful in the manufacture of articles requiring materials with high modulus, ultra-high ductility, good flow, thin wall flame retardancy and good impact strength.

In various aspects, the thermoplastic compositions can be prepared according to a variety of methods. The thermoplastic compositions of the present disclosure can be blended, compounded, or otherwise combined with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods can include, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the thermoplastic composition can be processed in an extruder at temperatures from 180° C. to 350° C., or from about 180° C. to about 350° C.

The advantageous mechanical characteristics of the thermoplastic compositions disclosed herein can make them appropriate for an array of uses. Suitable articles can be exemplified by, but are not limited to aircraft, automotive, truck, military vehicle (including automotive, aircraft, and water-borne vehicles), scooter, and motorcycle exterior and interior components, including panels, quarter panels, rocker panels, trim, fenders, doors, decklids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment; outboard motor housings; depth finder housings, personal water-craft; building and construction applications such as glazing, roofs, windows, etc.; outdoor and indoor signs; enclosures, housings, panels, and parts for automatic teller machines (ATM); computer; enclosures, housings, panels, and parts for lawn and garden tractors, lawn mowers, and tools; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; and like applications. The disclosure further contemplates additional fabrication operations on said articles, such as, but not limited to, molding, in-mold decoration, baking in a paint oven, lamination, and/or thermoforming. The articles made from the composition of the present disclosure may be used widely in automotive industry, home appliances, electrical components, and telecommunications.

In a further aspect, the present disclosure pertains to electrical or electronic devices comprising the thermoplastic compositions described herein. In a further aspect, the electrical or electronic device comprising the disclosed thermoplastic compositions can be a cellphone, a MP3 player, a computer, a laptop, a camera, a video recorder, an electronic tableta wireless car entry device, an automotive part, a kitchen appliance, an electrical housing, an electrical connector, a lighting fixture, a light emitting diode, an electrical part, or a telecommunications part.

In a further aspect, non-limiting examples of fields in which the thermoplastic compositions can be employed can include electrical, electro-mechanical, radio frequency (RF) technology, telecommunication, automotive, aviation, medical, sensor, military, and security. In a still further aspect, the thermoplastic compositions can also be present in overlapping fields.

In a further aspect, the suitable article can be an electronic device, automotive device, telecommunication device, medical device, security device, or mechatronic device. In a still further aspect, the article can be selected from a computer device, electromagnetic interference device, printed circuit, smart phone device, Wi-Fi device, Bluetooth device, GPS device, cellular antenna device, smart phone device, automotive device, medical device, sensor device, security device, shielding device, RF antenna device, LED device, and RFID device. In various aspects, molded articles according to the present disclosure can be used to produce a device in one or more of the foregoing fields. In a further aspect, the molded articles can be used to manufacture devices in the automotive field. In a still further aspect, non-limiting examples of such devices in the automotive field which can use the disclosed blended thermoplastic compositions in the vehicle's interior include adaptive cruise control, headlight sensors, windshield wiper sensors, and door/window switches. In a further aspect, non-limiting examples of devices in the automotive field which can the disclosed blended thermoplastic compositions in the vehicle's exterior include pressure and flow sensors for engine management, air conditioning, crash detection, and exterior lighting fixtures.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

EXAMPLES

Detailed embodiments of the present disclosure are disclosed herein; it is to be understood that the disclosed embodiments are merely exemplary of the disclosure that may be embodied in various forms. Therefore, specific structural and functional details disclosed herein are not to be interpreted as limits, but merely as a basis for teaching one skilled in the art to employ the present disclosure. The following examples are provided to illustrate the compositions, processes, and properties of the present disclosure. The examples are merely illustrative and are not intended to limit the disclosure to the materials, conditions, or process parameters set forth therein.

General Materials and Methods

The compositions as set forth in the Examples below were prepared from the components presented in Table 1.

TABLE 1

Components of the thermoplastic compositions.

| Item | Description | Name/Source |
|---|---|---|
| C023A | Polycarbonate derived from bisphenol A (30,000 Mw) | SABIC Lexan ™ ML5721 |
| C017) | Polycarbonate derived from bisphenol A (22,000 Mw) | SABIC Lexan ™ ML5221 |
| C9030P | Poly(bisphenol A carbonate)-polydimethylsiloxane block copolymer | SABIC Lexan ™ C9030P |
| C29449 | Poly (acrylonitrile-butadiene-styrene) bulk ABS | SABIC |
| L604625 | Poly(acrylonitrile-butadiene-styrene), high rubber grafted, having a polybutadiene content of about 55 weight percent | Kumho ABS 181 |
| C29355 | Poly (styrene-acrylonitrile) | SABIC |
| X893633 | Poly(ethylene-octene), having a 1-octene content of about 30 wt. % | ENGAGE ™ 8401 from Dow Chemical Co., Ltd. |
| F854837 | anhydride modified ethylene copolymer | DUPONT |
| C893072 | Ethylene-ethyl acrylate (EEA) copolymer | NUC-6510 from Nippon Unicar Company Limited. |
| X613342 | Ethylene-propylene-diene copolymer (EPDM) | Dow Nordel 4725P |
| F6843 | Copolymer of methyl methacrylate, butadiene, and styrene, (MBS) | Paraloid ™ EXL 2650A from Dow Chemical. |
| F232 | A core-shell copolymer impact modifier having about 80 wt. % of a core comprising poly(butyl acrylate) and about 20 wt % of a shell comprising poly(methyl methacrylate); (ACR) | PARALOID ™ EXL-3330 from Dow Chemical Co., Ltd. |
| F854837 | Maleic anhydride grafted Poly(ethylene-octene); 1 wt. % MAH; (POE-g-MAH) | Dupont Fusabond N493 |
| F6180 | Maleic anhydride grafted Ethylene-propylene-diene copolymer (EPDM-g-MAH) | Exxonmobil Exxelor VA1803 |
| F8210 | Methacrylate-acrylate-siloxane copolymer, 10% by weight of siloxane, (SiA) | S2001 from Mitsubishi rayon Co., Ltd. |
| CR741 | BPA Diphosphate (BPADP) | Daihachi Co. Ltd CR741 |
| G931F | Glass fiber, organic silane sized, having a diameter of about 13 micrometers and a pre-compounded length of about 4 millimeters (GF) | ECS303A from Chongqing Polycomp International Corp. |
| 5103-B | GF ECS03T-120/PL | Nippon |
| F502815 | Fine Talc | Luzenac; JETFINE ® 3CA |
| F533718 | Wollastonite; NYGLOS ®4W 10992 | NYCO |
| ARKON125 | alicyclic saturated hydrocarbon resin | ARAKAWA Chemical Industries Ltd. |
| F449 | Polytetrafluoroethylene, 50 weight percent, encapsulated in poly(styrene-co-acrylonitrile) (TSAN) | SABIC CYCOLAC ™ INP449 |
| F542 | Tris(2,4-di-tert-butylphenyl) phosphite; antioxidant | Ciba IRGAFOS 168 |
| F527 | Octadecyl 3-(3,5-di-tert-butyl-4-hydroxyphenyl)propionate; antioxidant | Ciba IRGANOX 1076 |
| F538 | Pentaerythritol tetrastearate (PETS) | PETS from FACI ASIA PACIFIC PTE LTD. |

Formulations were prepared by extruding the pre-blended components using a twin extruder. The composition was melt-kneaded and extruded. The extrudate was cooled using a water bath prior to pelletizing. Components were compounded using a 37 mm Toshiba TEM-37BS Twin Screw Extruder co-rotating twin screw extruder with the compounding settings set forth in Table 2

TABLE 2

| Compounding Settings | | |
|---|---|---|
| Extruder | | |
| Die | mm | 4 |
| Zone 1 Temp | ° C. | 50 |
| Zone 2 Temp | ° C. | 100 |
| Zone 3 Temp | ° C. | 200 |
| Zone 4 Temp | ° C. | 250 |
| Zone 5 Temp | ° C. | 260 |
| Zone 6 Temp | ° C. | 260 |
| Zone 7 Temp | ° C. | 260 |
| Zone 8 Temp | ° C. | 260 |
| Zone 9 Temp | ° C. | 260 |
| Die Temp | ° C. | 265 |
| Screw speed | rpm | 300 |
| Throughput | kg/hr | 40 |

The pellets obtained from extrusion were dried at 100° C. for four hours. The pellets were then injection molded using 150 T injection molding machine at a melt temperature of 270° C. and a mold temperature of 80° C. The injection molding parameters are set forth in Table 3.

TABLE 3

| Injection molding settings. | | |
|---|---|---|
| Molding Machine | | |
| Cnd: Pre-drying time | Hour | 4 |
| Cnd: Pre-drying temp | ° C. | 100 |
| Hopper temp | ° C. | 50 |
| Zone 1 temp | ° C. | 270 |
| Zone 2 temp | ° C. | 270 |
| Zone 3 temp | ° C. | 270 |
| Nozzle temp | ° C. | 270 |
| Mold temp | ° C. | 80 |
| Screw speed | rpm | 100 |
| Back pressure | kgf/cm$^2$ | 30 |
| Molding Machine | NONE | Fanuc |
| Mold Type (insert) | NONE | ASTM |

Molded samples were then tested in accordance with the standards presented below. Melt volume-flow rate ("MFR") was determined according to standard ASTM D1238 under the following test conditions: 300° C./1.2 kg load/1080 sec dwell time or 300° C./1.2 kg load/360 sec dwell time or 260° C./5 kg load or 260° C./2.16 kg load. Data below are provided for MVR in g$^3$/10 min. The notched Izod impact ("NII") test was carried out on 63.5 mm×12.7 mm×3.2 mm molded samples (bars) according to ASTM D256 at 0° C. and 23° C. Data units are J/m. Tensile properties were measured a Tensile Type 1 bar (50 mm×13 mm) in accordance with ASTM D638 using sample bars prepared in accordance with a Tensile Type 1 bar (50 mm×13 mm). Tensile strength for either at break or at yield is reported in units of MPa. Heat deflection temperature was determined per ASTM D648 with flatwise specimen orientation with specimen dimensions of 127 mm×12.7 mm×3.2 mm at 1.82 MPa. Data are provided below in units of ° C. Where applicable, multi-axial impact (MAI) strength testing was performed according to ASTM D3763 at 23° C. on disk specimens having a 100 mm diameter and a thickness of 3.2 mm.

Where applicable, flammability tests were performed following the procedure of Underwriter's Laboratory Bulletin 94 entitled "Tests for Flammability of Plastic Materials, UL 94". Several ratings can be applied based on the rate of burning, time to extinguish, ability to resist dripping, and whether or not drips are burning. Specimens for testing were foamed bars comprising of the foamed thermoplastic composition. Each specimen had a thickness of either 3 mm or 6 mm. Materials can be classified according to this procedure as UL 94 HB (horizontal burn), V0, V1, V2, 5VA and/or 5VB on the basis of the test results obtained for five samples; however, the compositions herein were tested and classified only as V0 and V1 the criteria for each of which are described below.

V0: In a sample placed so that its long axis is 180 degrees to the flame, the period of flaming and/or smoldering after removing the igniting flame does not exceed ten (10) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 50 seconds. V1: In a sample placed so that its long axis is 180 degrees to the flame, the period of flaming and/or smoldering after removing the igniting flame does not exceed thirty (30) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 250 seconds.

Illustrative Example A

Illustrative Example A presents the formulation and composite performance testing for formulations comprising the polycarbonate polymer, filler, polyolefin elastomer, and additives and are labeled Example 1, Example 2, and Example 3 (E1-E3) Comparative formulations are also prepared and labeled Comparative Example 1, Comparative Example 2, and the like (CE1-CE8). Table 4 presents these formulations where the filler comprises glass fiber.

TABLE 4

| Thermoplastic composition with glass fiber filler. | | | | | | | | | | | |
|---|---|---|---|---|---|---|---|---|---|---|---|
| | E1 | E2 | E3 | C1 | C2 | C3 | C4 | C5 | C6 | C7 | C8 |
| Component | | | | | | | | | | | |
| C017 | 77.54 | 77.54 | 74.45 | 79.54 | 64.54 | 77.54 | 77.54 | 74.54 | 74.54 | 77.54 | 77.54 |
| POE | 2 | 0 | 5 | 0 | 15 | 0 | 0 | 0 | 0 | 0 | 0 |
| EPDM | 0 | 2 | 0 | 0 | 0 | 0 | 0 | 0 | 0 | 0 | 0 |
| MBS | 0 | 0 | 0 | 0 | 0 | 2 | 0 | 5 | 0 | 0 | 0 |

TABLE 4-continued

Thermoplastic composition with glass fiber filler.

|  | E1 | E2 | E3 | C1 | C2 | C3 | C4 | C5 | C6 | C7 | C8 |
|---|---|---|---|---|---|---|---|---|---|---|---|
| ACR | 0 | 0 | 0 | 0 | 0 | 0 | 2 | 0 | 5 | 0 | 0 |
| POE-g-MAH | 0 | 0 | 0 | 0 | 0 | 0 | 0 | 0 | 0 | 2 | 0 |
| EPDM-g-MAH | 0 | 0 | 0 | 0 | 0 | 0 | 0 | 0 | 0 | 0 | 2 |
| GF | 20 | 20 | 20 | 20 | 20 | 20 | 20 | 20 | 20 | 20 | 20 |
| AO1 | 0.08 | 0.08 | 0.08 | 0.08 | 0.08 | 0.08 | 0.08 | 0.08 | 0.08 | 0.08 | 0.08 |
| AO2 | 0.08 | 0.08 | 0.08 | 0.08 | 0.08 | 0.08 | 0.08 | 0.08 | 0.08 | 0.08 | 0.08 |
| PETS | 0.3 | 0.3 | 0.3 | 0.3 | 0.3 | 0.3 | 0.3 | 0.3 | 0.3 | 0.3 | 0.3 |
| Properties |  |  |  |  |  |  |  |  |  |  |  |
| MFR@300° C., 1.2 Kg (g/10 min) | 14 | 13 | 15 | 15 | 18 | 13 | 15 | 10 | 10 | 11 | 13 |
| Tensile Modulus (MPa) | 6047 | 6034 | 5924 | 6050 | 5145 | 6017 | 6026 | 5738 | 5850 | 4860 | 5672 |
| NII@ 23° C. (J/m) | 169 | 156 | 172 | 105 | 124 | 119 | 133 | 155 | 179 | 145 | 106 |
| HDT 1.82 MPa (° C.) | 137 | 138 | 138 | 137 | 139 | 136 | 135 | 137 | 135 | 131 | 136 |

The addition of an unmodified, or unfunctionalized, polyolefin elastomer such as POE or EPDM provided an improved impact strength compared to substantially similar formulations comprising an acrylic impact modifier (MBS) or a modified polyolefin elastomer (POE-g-MAH or EPDM-g-MAH). Example 1 and Comparative Example 3 differ only in that the polyolefin elastomer POE was replaced with the acrylic impact modifier MBS. Comparative Example 1 had no polyolefin elastomer (modified or unmodified) or acrylic modifier. Example E1 exhibited higher values for flow, tensile, impact strength, and heat deflection temperature than C1 and C3. The use of a coreshell impact modifier, such as ACR or the modified polyolefin elastomer, as in Comparative examples C4 through C8 also showed lover values for flow, tensile, impact strength, and heat deflection temperature. However, increasing the load of unmodified polyolefin elastomer to 15 wt. % in C2 provided the highest flow (18 g/10 min) and heat deflection temperature (139° C.), but also caused lower modulus impact strength when compared to E1-E3, which have lower loadings of unmodified polyolefin elastomer.

Table 5 presents the formulation and composite performance for formulations comprising the polycarbonate polymer, filler, polyolefin elastomer, and additives. However here, the filler for these formulations was talc. Compared to the samples presented in Table 4, these samples also comprise a mixture of bisphenol A polycarbonate polymers (C023A and C017). Inventive samples were labeled Example 4 and Example 5 (E4 and E5). Comparative formulations were also prepared and labeled Comparative Example 9 and Comparative Example 10 (CE9 and CE10).

TABLE 5

Thermoplastic composition with talc filler.

|  | C9 | E4 | C10 | E5 |
|---|---|---|---|---|
| Component |  |  |  |  |
| C023A | 66.05 | 66.05 | 57.05 | 57.05 |
| C017 | 10.6 | 10.6 | 9.6 | 9.6 |
| MBS | 5 | 0 | 5 | 0 |
| POE | 0 | 5 | 0 | 5 |
| TALC | 17 | 17 | 17 | 17 |
| SAN | 0 | 0 | 10 | 10 |
| AO1 | 0.1 | 0.1 | 0.1 | 0.1 |
| AO2 | 0.25 | 0.25 | 0.25 | 0.25 |
| PETS | 0.25 | 0.25 | 0.25 | 0.25 |

TABLE 5-continued

Thermoplastic composition with talc filler.

|  | C9 | E4 | C10 | E5 |
|---|---|---|---|---|
| Properties |  |  |  |  |
| MFR 260° C., 5 kg (g/10 min) | 7.6 | 14.7 | 10.5 | 18.0 |
| Tensile Modulus (MPa) | 3724 | 3474 | 3492 | 3750 |
| NII@ 23° C. (J/m) | 602 | 742 | 414 | 616 |
| HDT 1.82 MPa (° C.) | 127 | 129 | 121 | 122 |

Comparative Examples 9 and 10 (C9 and C10) contained an acrylic modifier MES at 5 wt. % loading. Examples 4 and 5 (E4 and E5) instead contained a polyolefin elastomer at the same loading, 5 wt. %. C9 and E4 differ only in that the C9 had MBS and E4 contained POE. E4 exhibited higher values than C9 for flow (14.7 g/10 min compared to 7.6 g/10 min), for impact strength (742 J/m compared to 602 J/m), and for heat deflection temperature (129° C. compared to 127° C.). Samples C10 and E5 further comprised SAN and differed in that C10 had MES while E5 comprised POE instead. Similar to E4, sample E5 exhibited improved values compared to its MBS counterpart C10 for flow (18.0 g/10 min compared to 10.5 g/10 min), for impact strength (616 J/m compared to 414 J/m), and for heat deflection temperature (122° C. compared to 121° C.). E5 also exhibited an increased tensile modulus compared to the MBS containing sample C10 (3750 MPa compared to 3492 MPa).

Illustrative Example B

Illustrative Example B presents the formulation and composite performance testing for formulations comprising the polycarbonate polymer, filler, polyolefin elastomer, additives, and a flame retardant additive. Table 6 shows the formulation and mechanical properties for an inventive sample comprising the polycarbonate polymer, glass fiber, polyolefin elastomer, additives, and a flame retardant. The inventive sample is labeled Example 6 (E6). Comparative formulations are also prepared and labeled Comparative Example 11 through Comparative Example 14 (C11-C14).

TABLE 6

Thermoplastic compositions with glass filler and flame retardant.

| | E6 | C11 | C12 | C13 | C14 |
|---|---|---|---|---|---|
| Component | | | | | |
| C023A | 54.84 | 54.84 | 54.84 | 54.84 | 43.84 |
| C017 | 12 | 12 | 12 | 12 | 12 |
| POE | 4 | 0 | 0 | 0 | 0 |
| MBS | 0 | 4 | 0 | 0 | 0 |
| HRG | 0 | 0 | 4 | 0 | 0 |
| SiA | 0 | 0 | 0 | 4 | 0 |
| BABS | 0 | 0 | 0 | 0 | 15 |
| BPADP | 13 | 13 | 13 | 13 | 13 |
| GF | 15 | 15 | 15 | 15 | 15 |
| TSAN | 0.5 | 0.5 | 0.5 | 0.5 | 0.5 |
| AO1 | 0.08 | 0.08 | 0.08 | 0.08 | 0.08 |
| AO2 | 0.08 | 0.08 | 0.08 | 0.08 | 0.08 |
| PETS | 0.5 | 0.5 | 0.5 | 0.5 | 0.5 |
| Properties | | | | | |
| MFR@260° C., 2.16 Kg (g/10 min) | 25 | 18 | 19 | 18 | 25 |
| Tensile Modulus (MPa) | 5730 | 5729 | 5824 | 5490 | 5945 |
| NII@ 23° C. (J/m) | 92 | 77 | 75 | 66 | 85 |
| MAI Total Energy (J) | 18 | 17 | 15 | 12 | 8 |
| UL94 VX-1.5 mm Rating | V0 | V0 | V0 | V0 | V1 |

Comparative Examples 11 through 14 (C11 to C14) did not contain a polyolefin elastomer. Instead, these samples comprised either an acrylic modifier (MBS, C11) for flow or, a high rubber grafted impact modifier such (HRG, C12), a siloxane core shell impact modifier (SiA, C13), or a bulk acrylonitrile butadiene styrene (BABS, C14) impact modifier. Sample E6, which contained the polyolefin elastomer, exhibited a balance of mechanical properties compared to Samples C11 to C14. E6 showed a higher flow, notched Izod impact strength, and multi-axial impact strength than the comparative samples. Although the BABS sample C14 improved upon tensile strength and matched flow compared to E6, C14 had a significantly lower multi-axial strength and a different flame rating. Accordingly, E6 exhibited improved mechanical properties throughout.

Table 7 provides the formulations comprising a flame retardant as well as a filler of wollastonite or glass fiber. The polycarbonate polymer component of these samples further contained a mixture of polycarbonates (C023A and C017) and a polycarbonate-polysiloxane copolymer C9030P.

TABLE 7

Compositions with filler, flame retardant, and polysiloxane copolymer.

| | C15 | E7 | C16 | E8 |
|---|---|---|---|---|
| Component | | | | |
| C023A | 31.42 | 31.42 | 31.42 | 31.42 |
| C017 | 21.42 | 21.42 | 21.42 | 21.42 |
| C9030P | 2 | 2 | 2 | 2 |
| Arkon 125 | 3 | 3 | 3 | 3 |
| Wollastonite | 25 | 25 | 25 | 0 |
| GF | 0 | 0 | 0 | 25 |
| BPADP | 10 | 10 | 10 | 10 |
| POE | 0 | 6 | 0 | 6 |
| EEA | 0 | 0 | 6 | 0 |
| MAH-g-POE | 6 | 0 | 0 | 0 |
| AO1 | 0.08 | 0.08 | 0.08 | 0.08 |
| AO2 | 0.08 | 0.08 | 0.08 | 0.08 |
| PETS | 0.5 | 0.5 | 0.5 | 0.5 |

TABLE 7-continued

Compositions with filler, flame retardant, and polysiloxane copolymer.

| | C15 | E7 | C16 | E8 |
|---|---|---|---|---|
| Properties | | | | |
| MFR@260° C., 2.16 Kg (g/10 min) | 8.3 | 26.8 | 21.3 | 13.8 |
| Tensile Modulus (MPa) | 2226 | 3373 | 3939 | 7497 |
| NII@ 23° C. (J/m) | 57 | 74 | 112 | 107 |
| HDT 1.82 MPa, 3.2 mm (° C.) | 80 | 80 | 78 | 96 |
| UL94 VX-1.5 mm Rating | NONE | V1 | NONE | V1 |

Comparative Sample 15 (C15) and Example 7 differed in that E7 comprised the polyolefin elastomer (POE) while C15 contained a modified polyolefin elastomer (MAH-g-POE). Example 7 exhibited higher values than C15 for flow (26.8 g/10 min compared to 8.3 g/10 min), tensile strength (3373 MPa compared to 2226 MPa), notched Izod impact strength (74 J/m compared to 57 J/m). Comparative Sample 16 (C16) and Example 8 differed in that C16 comprised wollastonite rather than glass fiber and in that C16 contained ethylene-ethyl acrylate as an elastomer rather than POE. Here, E8 only improved upon the tensile strength and heat deflection temperature.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In various aspects, the present invention pertains to and includes at least the following aspects.

Aspect 1. A thermoplastic composition comprising: from about 49 wt. % to about 98 wt. % of a polycarbonate component; from about 1 wt. % to about 50 wt. % of a filler; and from about 0.5 wt. % to about 10 wt. % of a polyolefin elastomer; and from about 0.01 wt. % to about 1 wt. % of an additive, wherein the thermoplastic composition exhibits an notched Izod impact strength of at least about 150 J/m to about 750 J/m at 23° C. according to ASTM D256, wherein the thermoplastic composition exhibits a modulus of at least about 3300 MPa to about 6100 MPa according to ASTM D638, wherein the thermoplastic composition exhibits a melt flow rate of at least about 10 g/10 min to about 25 g/10 min when measured at 300° C. under a load of 1.2 kg, or at 260° C. under a load of 5 kg according to ASTM D1238, and wherein the combined weight percent value of all components does not exceed about 100 wt. %, and wherein all weight percent values are based on the total weight of the composition.

Aspect 2. A thermoplastic composition consisting of: from about 49 wt. % to about 98 wt. % of a polycarbonate component; from about 1 wt. % to about 50 wt. % of a filler; and from about 0.5 wt. % to about 10 wt. % of a polyolefin elastomer, wherein the thermoplastic composition exhibits an notched Izod impact strength of at least about 150 J/m to about 750 J/m at 23° C. according to ASTM D256, wherein the thermoplastic composition exhibits a modulus of at least about 3300 MPa to about 6100 MPa according to ASTM D638, wherein the thermoplastic composition exhibits a melt flow rate of at least about 10 g/10 min to about 25 g/10 min when measured at 300° C. under a load of 1.2 kg, or at 260° C. under a load of 5 kg according to ASTM D1238, and wherein the combined weight percent value of all components does not exceed about 100 wt. %, and wherein all weight percent values are based on the total weight of the composition.

Aspect 3. A thermoplastic composition consisting essentially of: from about 49 wt. % to about 98 wt. % of a polycarbonate component; from about 1 wt. % to about 50 wt. % of a filler; and from about 0.5 wt. % to about 10 wt. % of a polyolefin elastomer, wherein the thermoplastic composition exhibits an notched Izod impact strength of at least about 150 J/m to about 750 J/m at 23° C. according to ASTM D256, wherein the thermoplastic composition exhibits a modulus of at least about 3300 MPa to about 6100 MPa according to ASTM D638, wherein the thermoplastic composition exhibits a melt flow rate of at least about 10 g/10 min to about 25 g/10 min when measured at 300° C. under a load of 1.2 kg, or at 260° C. under a load of 5 kg according to ASTM D1238, and wherein the combined weight percent value of all components does not exceed about 100 wt. %, and wherein all weight percent values are based on the total weight of the composition.

Aspect 4. The thermoplastic composition of aspect 1, wherein the filler comprises glass fiber and the thermoplastic composition exhibits one or more of a notched Izod impact strength of at least about 550 J/m to about 180 J/m, a modulus of at least about 5900 MPa to about 6100 MPa, a melt flow rate of at least about 10 g/10 min to about 20 g/10 min when measured at 300° C. under a load of 1.2 kg, and a heat deflection temperature of at least about 130° C. to about 140° C. when measured at 1.82 MPa.

Aspect 5. The thermoplastic composition of aspect 1, wherein the filler comprises talc and the thermoplastic composition exhibits one or more of a notched Izod impact strength of at least about 550 J/m to about 750 J/m, a modulus of at least about 3300 MPa to about 4000 MPa, a melt flow rate of at least about 10 g/10 min to about 25 g/10 min when measured at 260° C. under a load of 5 kg, and a heat deflection temperature of at least about 115° C. to about 135° C. when measured at 1.82 MPa.

Aspect 6. A thermoplastic composition comprising: from about 49 wt. % to about 80 wt. % of a polycarbonate component; from about 10 wt. % to about 40 wt. % of a filler; from about 0.5 wt. % to about 10 wt. % of a polyolefin elastomer; from about 8 wt. % to about 15 wt. % of a flame retardant; and from about 0.01 wt. % to about 1 wt. % of an additive, wherein the thermoplastic composition exhibits an notched Izod impact strength of at least about 70 J/m to about 120 J/m at 23° C. according to ASTM D256, wherein the thermoplastic composition exhibits a modulus of at least about 3300 MPa to about 7600 MPa according to ASTM D638, wherein the thermoplastic composition exhibits a melt flow rate of at least about 10 g/10 min to about 30 g/10 min when measured at 260° C. under a 2.16 kg load according to ASTM D1238, wherein the thermoplastic composition achieves a UL 94 V0 rating of 1.5 mm or less or a UL 94 V1 rating of 1.2 mm or less, and wherein the combined weight percent value of all components does not exceed about 100 wt. %, and wherein all weight percent values are based on the total weight of the composition.

Aspect 7. A thermoplastic composition comprising: from about 49 wt. % to about 80 wt. % of a polycarbonate component; from about 10 wt. % to about 40 wt. % of a filler; from about 0.5 wt. % to about 10 wt. % of a polyolefin elastomer; and from about 8 wt. % to about 15 wt. % of a flame retardant, wherein the thermoplastic composition exhibits an notched Izod impact strength of at least about 70 J/m to about 120 J/m at 23° C. according to ASTM D256, wherein the thermoplastic composition exhibits a modulus of at least about 3300 MPa to about 7600 MPa according to ASTM D638, wherein the thermoplastic composition exhibits a melt flow rate of at least about 10 g/10 min to about 30 g/10 min when measured at 260° C. under a 2.16 kg load according to ASTM D1238, wherein the thermoplastic composition achieves a UL 94 V0 rating of 1.5 mm or less or a UL 94 V1 rating of 1.2 mm or less, and wherein the combined weight percent value of all components does not exceed about 100 wt. %, and wherein all weight percent values are based on the total weight of the composition.

Aspect 8. The thermoplastic composition of aspect 4, wherein the filler comprises glass fiber and the thermoplastic composition exhibits one or more of a notched Izod impact strength of at least about 85 J/m to about 100 J/m, a modulus of at least about 5500 MPa to about 6000 MPa, a melt flow rate of at least about 20 g/10 min to about 30 g/10 min when measured at 260° C. under a load of 2.16 kg, and a UL 94 flame retardance rating of V0 at least about 1.5 mm.

Aspect 9. The thermoplastic composition of aspect 4, wherein the filler comprises talc and the thermoplastic composition exhibits one or more of a notched Izod impact strength of at least about 70 J/m to about 110 J/m, a modulus of at least about 3300 MPa to about 7600 MPa, a melt flow rate of at least about 10 g/10 min to about 30 g/10 min when measured at 260° C. under a load of 2.16 kg, and a UL 94 flame retardance rating of V1 at least about 1.2 mm.

Aspect 10. The thermoplastic composition of any of aspects 4-6, wherein the flame retardant comprises bisphenol A diphenyl phosphate.

Aspect 11. The thermoplastic composition of any of aspects 1-7, wherein the polyolefin elastomer comprises an unmodified poly(ethylene-octene) polymer.

Aspect 12. The thermoplastic composition of any of aspects 1-7, wherein the polyolefin elastomer comprises an unmodified ethylene-propylene-diene copolymer.

Aspect 13. The thermoplastic composition of any of aspects 1-9, wherein the additive comprises a plasticizer, a stabilizer, an anti-static agent, an impact modifier, a colorant, an antioxidant, a mold release agent, an ultraviolet absorber, a lubricant, or a blowing agent, or a combination thereof.

Aspect 14. An article prepared from the composition of any one of aspects 1-12.

Aspect 15. A method comprising: forming a thermoplastic composition comprising: from about 49 wt. % to about 80 wt. % of a polycarbonate component; from about 10 wt. % to about 40 wt. % of a filler; from about 0.5 wt. % to about 10 wt. % of a polyolefin elastomer; from about 8 wt. % to about 15 wt. % of a flame retardant; and from about 0.01 wt. % to about 1 wt. % of an additive, wherein the combined weight percent value of all components does not exceed about 100 wt. %, and wherein all weight percent values are based on the total weight of the composition.

Aspect 16. A method comprising: forming a thermoplastic composition comprising: from about 49 wt. % to about 80 wt. % of a polycarbonate component; from about 10 wt. % to about 40 wt. % of a filler; from about 0.5 wt. % to about 10 wt. % of a polyolefin elastomer; and from about 8 wt. % to about 15 wt. % of a flame retardant, wherein the combined weight percent value of all components does not exceed about 100 wt. %, and wherein all weight percent values are based on the total weight of the composition.

Aspect 17. A method comprising: forming a thermoplastic composition comprising: from about 49 wt. % to about 98 wt. % of a polycarbonate component, from about 1 wt. % to about 50 wt. % of a filler, from about 0.5 wt. % to about 10 wt. % of a polyolefin elastomer; and from about 0.01 wt. % to about 1 wt. % of an additive, wherein the combined weight percent value of all components does not exceed about 100 wt. %, and wherein all weight percent values are based on the total weight of the composition.

Aspect 18. A method comprising: forming a thermoplastic composition comprising: from about 49 wt. % to about 98 wt. % of a polycarbonate component; from about 1 wt. % to about 50 wt. % of a filler; and from about 0.5 wt. % to about 10 wt. % of a polyolefin elastomer, wherein the combined weight percent value of all components does not exceed about 100 wt. %, and wherein all weight percent values are based on the total weight of the composition.

Aspect 19. An article formed according to the method of any of aspects 15-18.

Aspect 20. A thermoplastic composition comprising: from about 49 wt. % to about 98 wt. % of a polycarbonate component; from about 1 wt. % to about 50 wt. % of a filler; and from about 0.5 wt. % to about 10 wt. % of a polyolefin elastomer.

Aspect 21. The thermoplastic composition of aspect 20, wherein the filler comprises glass fiber or talc.

Aspect 22. A thermoplastic composition comprising: from about 49 wt. % to about 80 wt. % of a polycarbonate component; from about 10 wt. % to about 40 wt. % of a filler; from about 0.5 wt. % to about 10 wt. % of a polyolefin elastomer; and from about 8 wt. % to about 15 wt. % of a flame retardant.

Aspect 23. The thermoplastic composition of aspect 22, wherein the filler comprises glass fiber or talc.

Aspect 24. The thermoplastic composition of aspect 1, wherein the composition comprises 10 wt. % to 40 wt. % of a filler and wherein the composition further comprises 8 wt. % to 15 wt. % of a flame retardant; wherein the thermoplastic composition exhibits an notched Izod impact strength of at least 70 J/m to 120 J/m at 23° C. according to ASTM D256, wherein the thermoplastic composition exhibits a modulus of at least 3300 MPa to 7600 MPa according to ASTM D638, wherein the thermoplastic composition exhibits a melt flow rate of at least 10 g/10 min to 30 g/10 min when measured at 260° C. under a 2.16 kg load according to ASTM D1238, wherein the thermoplastic composition achieves a UL 94 V0 rating of 1.5 mm or less or a UL 94 V1 rating of 1.2 mm or less, and wherein the combined weight percent value of all components does not exceed 100 wt. %, and wherein all weight percent values are based on the total weight of the composition.

Aspect 25. The thermoplastic composition of aspect 24, wherein the filler comprises glass fiber and the thermoplastic composition exhibits one or more of a notched Izod impact strength of at least 85 J/m to 100 J/m, a modulus of at least 5500 MPa to 6000 MPa, a melt flow rate of at least 20 g/10 min to 30 g/10 min when measured at 260° C. under a load of 2.16 kg, and a UL 94 flame retardance rating of V0 at least 1.5 mm.

Aspect 26. The thermoplastic composition of aspect 24, wherein the filler comprises talc and the thermoplastic composition exhibits one or more of a notched Izod impact strength of at least 70 J/m to 110 J/m, a modulus of at least 3300 MPa to 7600 MPa, a melt flow rate of at least 10 g/10 min to 30 g/10 min when measured at 260° C. under a load of 2.16 kg, and a UL 94 flame retardance rating of V1 at least 1.2 mm.

Aspect 27. The thermoplastic composition of any of aspects 1, or 24-26, wherein the flame retardant comprises bisphenol A diphenyl phosphate.

Aspect 28. The thermoplastic composition of any of aspects 1, or 24-27, wherein the polyolefin elastomer comprises an unmodified poly(ethylene-octene) polymer.

Aspect 29. The thermoplastic composition of any of aspects 1, or 24-28, wherein the polyolefin elastomer comprises an unmodified ethylene-propylene-diene copolymer.

Aspect 30. The thermoplastic composition of any of aspects 1, or 24-29, wherein the additive comprises a plasticizer, a stabilizer, an anti-static agent, an impact modifier, a colorant, an antioxidant, a mold release agent, an ultraviolet absorber, a lubricant, or a blowing agent, or a combination thereof.

Aspect 31. An article prepared from the composition of any one of aspects 1, or 24-30.

While aspects of the present disclosure can be described and claimed in a particular statutory class, such as the system statutory class, this is for convenience only and one of skill in the art will understand that each aspect of the present invention can be described and claimed in any statutory class. Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this disclosure belongs.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. A value modified by a term or terms, such as "about" and "substantially," is intended to include the degree of error associated with measurement of the particular quantity based upon the equipment available at the time of filing this application. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

Disclosed are component materials to be used to prepare disclosed compositions as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Compounds disclosed herein are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

As used herein, the terms "weight average molecular weight" or "Mw" can be used interchangeably, and are defined by the formula:

$$Mw = \frac{\sum N_i M_i^2}{\sum N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured by gel permeation chromatography. In some cases, Mw can be measured by gel permeation chromatography and calibrated with polycarbonate standards. As an example, a polycarbonate of the present disclosure can have a weight average molecular weight of greater than 5,000 Daltons, or greater than about 5,000 Daltons based on PS standards. As a further example, the polycarbonate can have an Mw of from 20,000 Daltons to 100,000 Daltons, or from about 20,000 to about 100,000 Daltons.

What is claimed is:

1. A thermoplastic composition comprising:
   from 49 wt. % to 98 wt. % of a polycarbonate component;
   from 1 wt. % to 50 wt. % of a filler; and
   from 0.5 wt. % to 10 wt. % of a polyolefin elastomer,
   wherein the thermoplastic composition exhibits a notched Izod impact strength of from 70 J/m to 750 J/m at 23° C. according to ASTM D256,
   wherein the thermoplastic composition exhibits a modulus of from 3300 MPa to 7600 MPa according to ASTM D638,
   wherein the thermoplastic composition exhibits a melt flow rate of from 10 g/10 min to 30 g/10 min when measured at 300° C. under a load of 1.2 kg, or at 260° C. under a load of 5 kg according to ASTM D1238, and
   wherein the combined weight percent value of all components does not exceed 100 wt. %, and wherein all weight percent values are based on the total weight of the composition.

2. The thermoplastic composition of claim 1, wherein the filler comprises glass fiber and the thermoplastic composition exhibits one or more of a notched Izod impact strength of from 180 J/m to 550 J/m, a modulus of from 5900 MPa to 6100 MPa, a melt flow rate of from 10 g/10 min to 20 g/10 min when measured at 300° C. under a load of 1.2 kg, and a heat deflection temperature of from 130° C. to 140° C. when measured at 1.82 MPa.

3. The thermoplastic composition of claim 1, wherein the filler comprises talc and the thermoplastic composition exhibits one or more of a notched Izod impact strength of from 550 J/m to 750 J/m, a modulus of from 3300 MPa to 4000 MPa, a melt flow rate of from 10 g/10 min to 25 g/10 min when measured at 260° C. under a load of 5 kg, and a heat deflection temperature of from 115° C. to 135° C. when measured at 1.82 MPa.

4. The thermoplastic composition of claim 1, wherein the composition comprises 10 wt. % to 40 wt. % of the filler and further comprises 8 wt. % to 15 wt. % of a flame retardant,
   wherein the thermoplastic composition achieves a UL 94 V0 rating of 1.5 mm or less or a UL 94 V1 rating of 1.2 mm or less.

5. The thermoplastic composition of claim 4, wherein the filler comprises glass fiber and the thermoplastic composition exhibits a UL 94 flame retardance rating of V0 at least 1.5 mm.

6. The thermoplastic composition of claim 4, wherein the filler comprises talc and the thermoplastic composition exhibits a UL 94 flame retardance rating of V1 at least 1.2 mm.

7. The thermoplastic composition of claim 1, wherein the flame retardant comprises bisphenol A diphenyl phosphate.

8. The thermoplastic composition of claim 1, wherein the polyolefin elastomer comprises a poly(ethylene-octene) polymer.

9. The thermoplastic composition of claim 1, wherein the polyolefin elastomer comprises an ethylene-propylene-diene copolymer.

10. The thermoplastic composition of claim 1, wherein the composition further comprises an additive comprising a plasticizer, a stabilizer, an anti-static agent, an impact modifier, a colorant, an antioxidant, a mold release agent, an ultraviolet absorber, a lubricant, or a blowing agent, or a combination thereof.

11. An article prepared from the thermoplastic composition of claim 1.

12. A method comprising:
forming a thermoplastic composition comprising:
from 49 wt. % to 98 wt. % of a polycarbonate component;
from 1 wt. % to 50 wt. % of a filler; and
from 0.5 wt. % to 10 wt. % of a polyolefin elastomer,
  wherein the thermoplastic composition exhibits a notched Izod impact strength of from 70 J/m to 750 J/m at 23° C. according to ASTM D256,
  wherein the thermoplastic composition exhibits a modulus of from 3300 MPa to 7600 MPa according to ASTM D638,
  wherein the thermoplastic composition exhibits a melt flow rate of from 10 g/10 min to 30 g/10 min when measured at 300° C. under a load of 1.2 kg, or at 260° C. under a load of 5 kg according to ASTM D1238,
  wherein the combined weight percent value of all components does not exceed 100 wt. %, and
  wherein all weight percent values are based on the total weight of the composition.

13. The method of claim 12, wherein the filler is present in an amount of from 10 wt. % to 40 wt. %.

14. An article formed according to the method of claim 12.

* * * * *